(12) United States Patent
Huang et al.

(10) Patent No.: US 10,784,952 B2
(45) Date of Patent: Sep. 22, 2020

(54) REPEATER

(71) Applicant: WISTRON NEWEB CORPORATION, Hsinchu (TW)

(72) Inventors: Tsun-Che Huang, Hsinchu (TW); Horen Chen, Hsinchu (TW); Shoou-Hann Huang, Hsinchu (TW); Nai-Yu Tseng, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 0 days.

(21) Appl. No.: 16/541,250

(22) Filed: Aug. 15, 2019

(65) Prior Publication Data
US 2020/0145094 A1 May 7, 2020

Related U.S. Application Data

(60) Provisional application No. 62/754,594, filed on Nov. 2, 2018, provisional application No. 62/757,791, filed on Nov. 9, 2018.

(51) Int. Cl.
*H04W 88/04* (2009.01)
*H04B 7/155* (2006.01)

(52) U.S. Cl.
CPC ....... *H04B 7/15571* (2013.01); *H04B 7/1555* (2013.01); *H04B 7/15535* (2013.01); *H04B 7/15557* (2013.01)

(58) Field of Classification Search
CPC ............ H04B 7/15571; H04B 7/15535; H04B 7/1555; H04B 7/15557
USPC .............................................. 455/7, 11.1, 13.1
See application file for complete search history.

(56) References Cited

U.S. PATENT DOCUMENTS

| | | | | |
|---|---|---|---|---|
| 7,299,005 B1* | 11/2007 | Yarkosky | ........... | H04B 7/15528 370/226 |
| 7,577,398 B2* | 8/2009 | Judd | ........ | G01S 19/25 342/357.48 |
| 8,010,042 B2* | 8/2011 | Judd | ...... | H01Q 23/00 455/11.1 |
| 8,023,885 B2* | 9/2011 | Proctor, Jr. | ......... | H04B 7/2606 455/7 |
| 8,055,300 B2* | 11/2011 | Andersson | ........... | H04B 7/0874 455/562.1 |
| 8,059,727 B2* | 11/2011 | Proctor, Jr. | ............ | H04B 7/022 375/260 |
| 8,630,581 B2* | 1/2014 | Judd | ..................... | H04B 7/1555 455/24 |

(Continued)

Primary Examiner — Hai V Nguyen
(74) Attorney, Agent, or Firm — McClure, Qualey & Rodack, LLP

(57) ABSTRACT

A repeater includes a donor device, a service device, a down-link circuit and an up-link circuit. The donor device includes a first receiving antenna array, a first transmitting antenna array and a first antenna controller. The first receiving antenna array and the first transmitting antenna array are disposed on a first substrate having a first normal direction. The service device includes a second transmitting antenna, a second receiving antenna and a second antenna controller. The second transmitting antenna and the second receiving antenna are disposed on a second substrate having a second normal direction. The first normal direction is different from the second normal direction, and the first receiving antenna array and the first transmitting antenna array are orthogonally polarized with each other.

15 Claims, 13 Drawing Sheets

(56) References Cited

U.S. PATENT DOCUMENTS

| | | | | |
|---|---|---|---|---|
| 8,774,079 B2* | 7/2014 | Proctor, Jr. | H04B 7/0695 | 370/315 |
| 8,885,540 B2* | 11/2014 | Robertson | H04W 52/325 | 370/315 |
| 8,885,688 B2* | 11/2014 | Gainey | H04B 7/2606 | 375/211 |
| 8,971,796 B2* | 3/2015 | Judd | H04B 7/1555 | 455/11.1 |
| 9,119,061 B2* | 8/2015 | Mohamadi | H04B 7/2606 | |
| 9,653,770 B2* | 5/2017 | Henry | H01Q 9/0485 | |
| 9,774,382 B2* | 9/2017 | Mohamadi | B64C 39/024 | |
| 9,912,033 B2* | 3/2018 | Henry | H01Q 9/0485 | |
| 10,313,893 B2* | 6/2019 | Zhan | H04W 16/26 | |
| 10,484,078 B2* | 11/2019 | Gharavi | H04B 7/15528 | |
| 10,523,160 B2* | 12/2019 | Ashworth | H03F 3/72 | |
| 10,560,179 B2* | 2/2020 | Gharavi | H04B 7/2041 | |
| 2004/0110469 A1* | 6/2004 | Judd | G01S 19/25 | 455/15 |
| 2006/0205341 A1* | 9/2006 | Runyon | H04B 7/15542 | 455/11.1 |
| 2006/0205342 A1* | 9/2006 | McKay, Sr. | H04B 3/36 | 455/11.1 |
| 2006/0205343 A1* | 9/2006 | Runyon | H04B 7/15571 | 455/11.1 |
| 2007/0010198 A1* | 1/2007 | McKay, Sr. | H04B 7/15571 | 455/10 |
| 2010/0029197 A1* | 2/2010 | Judd | H01Q 21/29 | 455/11.1 |
| 2011/0312269 A1* | 12/2011 | Judd | H01Q 25/005 | 455/11.1 |
| 2013/0130620 A1* | 5/2013 | Judd | H01Q 3/46 | 455/24 |
| 2013/0248656 A1* | 9/2013 | Mohamadi | H04B 7/18504 | 244/190 |
| 2014/0127989 A1* | 5/2014 | Judd | G01S 19/25 | 455/24 |
| 2019/0020401 A1* | 1/2019 | Gharavi | H04B 7/15 | |
| 2019/0020402 A1* | 1/2019 | Gharavi | H04B 7/15528 | |
| 2019/0020407 A1* | 1/2019 | Gharavi | H04B 17/318 | |

* cited by examiner

REPEATER

CROSS-REFERENCE TO RELATED PATENT APPLICATION

This application claims priority from the U. S. Provisional Patent Applications Ser. No. 62/754,594 filed Nov. 2, 2018, No. 62/757,791 filed Nov. 9, 2018, which application is incorporated herein by reference in its entirety.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a repeater, and more particularly to a repeater for improving isolations between transmitting and receiving antenna arrays.

BACKGROUND OF THE DISCLOSURE

Fifth generation (5G) communications systems provide a dramatic increase in data rates over existing technologies while allowing network access for many devices. In order to meet system demands for capacity and throughput, antennas with high gain and multi-beams are required. Furthermore, the high data rates anticipated for 5G encourage the use of millimeter wave frequency bands in addition to the traditional frequency bands used by earlier mobile technologies such as 4G, 3G etc.

In the 5G mobile communication, both sub-6 GHz and above-6 GHz frequency bands will be used. In order to provide ubiquitous 5G coverage for both outdoor and indoor environments, repeaters are often required to extend transmission distance and coverage. However, interferences between transmitting and receiving ends of the repeaters can be severe.

SUMMARY OF THE DISCLOSURE

In response to the above-referenced technical inadequacies, the present disclosure provides a repeater for improving isolations between transmitting and receiving antennas.

In one aspect, the present disclosure provides a repeater including a donor device, a service device, a down-link circuit and an up-link circuit. The donor device includes a first receiving antenna array, a first transmitting antenna array and a first antenna controller. The first receiving antenna array and the first transmitting antenna array are disposed on a first substrate having a first normal direction, and the first antenna controller is configured to control the first receiving antenna array and the first transmitting antenna array to receive and transmit data from and to a base station, respectively. The service device includes a second transmitting antenna, a second receiving antenna and a second antenna controller. The second transmitting antenna and the second receiving antenna are disposed on a second substrate having a second normal direction, and the second antenna controller is configured to control the second transmitting antenna and the second receiving antenna to receive and transmit data from and to customer premise equipment (CPE), respectively. The down-link (DL) circuit includes a first low noise amplifier (LNA) coupled to the first receiving antenna array, a first buffer circuit coupled to the first LNA, and a first power amplifier (PA) coupled between the first buffer circuit and the second transmitting antenna. The up-link circuit includes a second low noise amplifier (LNA) coupled to the second receiving antenna, a second buffer circuit coupled to the second low noise amplifier, and a second power amplifier (PA) coupled between the second buffer circuit and the first transmitting antenna array. The first normal direction is different from the second normal direction, and the first receiving antenna array and the first transmitting antenna array are orthogonally polarized with each other.

In certain embodiments, the second transmitting antenna and the second receiving antenna are orthogonally polarized with each other.

In certain embodiments, the first receiving antenna array and the second transmitting antenna are orthogonally polarized with each other.

In certain embodiments, the first transmitting antenna array and the second transmitting antenna are orthogonally polarized with each other.

In certain embodiments, the first substrate includes a first sub-substrate and a second sub-substrate, and the first receiving antenna array and the first transmitting antenna array are disposed on the first sub-substrate and the second sub-substrate, respectively.

In certain embodiments, the second substrate includes a third sub-substrate and a fourth sub-substrate, and the second receiving antenna and the second transmitting antenna are disposed on the third sub-substrate and the fourth sub-substrate, respectively.

In certain embodiments, the present disclosure provides the repeater including a first horn-shaped shielding and a second horn-shaped shielding. The first horn-shaped shielding has a plurality of first side walls disposed along sides of the first substrate, and the plurality of first side walls are tilted with a first predetermined angle with respect to the first normal direction of the first sub-substrate. The second horn-shaped shielding has a plurality of second side walls disposed along sides of the second substrate, and the plurality of second side walls are tilted with a second predetermined angle with respect to the second normal direction of the second sub-substrate.

In certain embodiments, the second transmitting antenna further includes a second transmitting antenna array, and the second receiving antenna further includes a second receiving antenna array.

In certain embodiments, the DL circuit further includes a first power detector and a first control circuit. The first power detector configured to detect a first received signal strength indication (RSSI) of a first signal from the first LNA, and the first control circuit configured to determine whether the first RSSI is higher than a first threshold or lower than a second threshold. If the first RSSI is determined to be higher than the first threshold, the first control circuit is configured to adjust a gain of the first PA to be decreased. If the first RSSI is determined to be lower than the second threshold, the first control circuit is configured to adjust the gain of the first PA to be increased.

In certain embodiments, the first control circuit is configured to determine whether the first RSSI is lower than a third threshold. If the first RSSI is lower than the third threshold, the first control circuit is configured to turn off the first PA, and the third threshold is lower than the second threshold.

In certain embodiments, the UL circuit further includes a second power detector and a second control circuit. The second power detector is configured to detect a second received signal strength indication (RSSI) of a second signal from the second LNA, and the second control circuit is configured to determine whether the second RSSI is higher than a fourth threshold or lower than a fifth threshold. If the second RSSI is determined to be higher than the fourth threshold, the second control circuit is configured to adjust a gain of the second PA to be decreased. If the second RSSI is determined to be lower than the fifth threshold, the second control circuit is configured to adjust the gain of the second PA to be increased.

In certain embodiments, the second control circuit is configured to determine whether the second RSSI is lower than a sixth threshold. If the second RSSI is lower than the sixth threshold, the second control circuit is configured to turn off the first PA, and the sixth threshold is lower than the fifth threshold.

In certain embodiments, the second control circuit is further configured to transmit a first control signal to the first control circuit when the second signal is detected to be received from the second LNA by the second power detector, and the first control circuit is configured to turn off the first PA when the first control signal is received.

In certain embodiments, the first control circuit is further configured to transmit a second control signal to the second control circuit when the first signal is detected to be received from the first LNA by the first power detector, and the second control circuit is configured to turn off the second PA when the second control signal is received.

In certain embodiments, the present disclosure provides the repeater including a first frequency selective surface (FSS) and a second frequency selective surface (FSS). The first frequency selective surface (FSS) is disposed between the first receiving antenna array and the second transmitting antenna, and the second frequency selective surface (FSS) is disposed between the second receiving antenna and the first transmitting antenna array.

In certain embodiments, the first antenna controller is configured to control the first receiving antenna array to receive data with a first radiation pattern having a first receiving direction, the second antenna controller is configured to control the second transmitting antenna to transmit data with a second radiation pattern having a second transmitting direction, the second radiation pattern includes a second main beam along the second transmitting direction and a plurality of side lobes, and the second controller is configured to decrease gains of the side lobes by executing a controlling algorithm.

Therefore, the repeater provided by the present disclosure can provide better isolation by utilizing orthogonally polarized antenna array on transmitting ends and receiving ends, respectively, and a horn-shaped shielding are also used to isolate signals transmitted from the transmitting ends and the receiving ends of the repeater.

In addition, power detectors and control circuits can be utilized to turn power amplifiers on/off to get better isolation between the transmitting ends and the receiving ends of the repeater, and better isolation between the up-link device and the down-link device in TDD mode.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
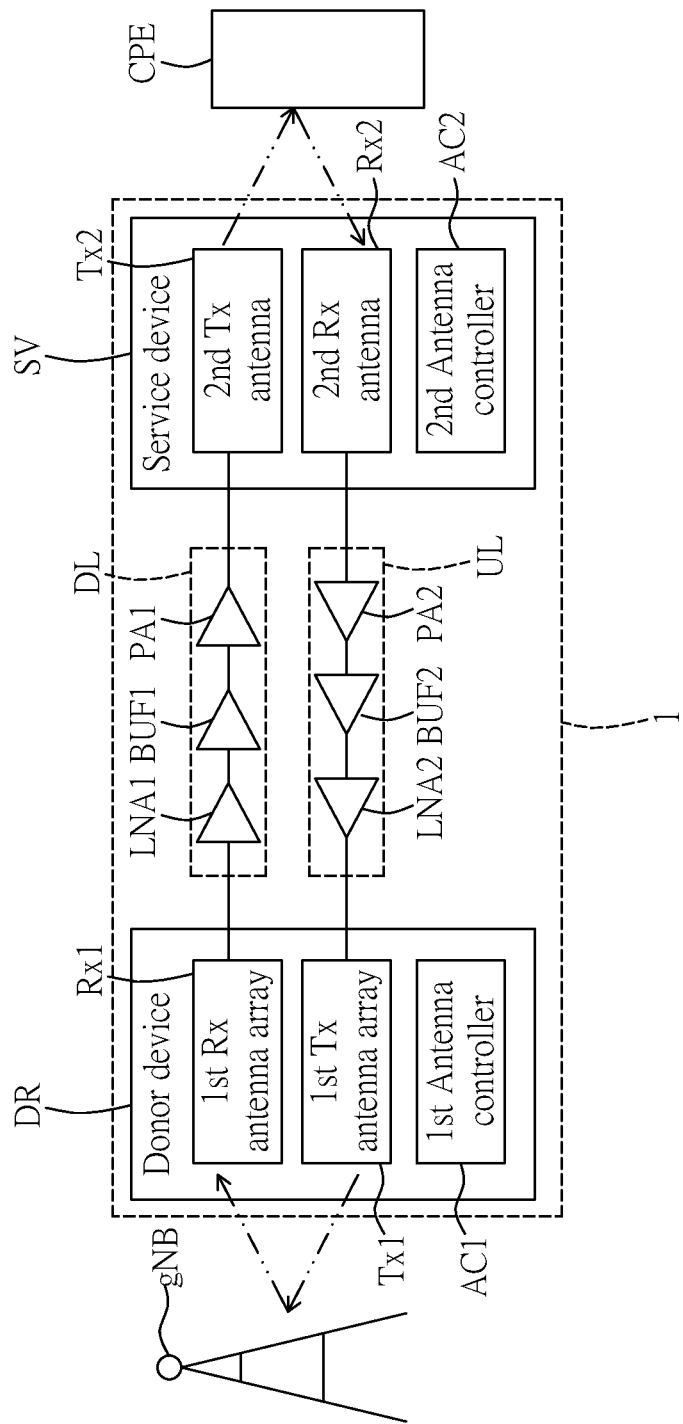
FIG. 1 is a block diagram of a repeater according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
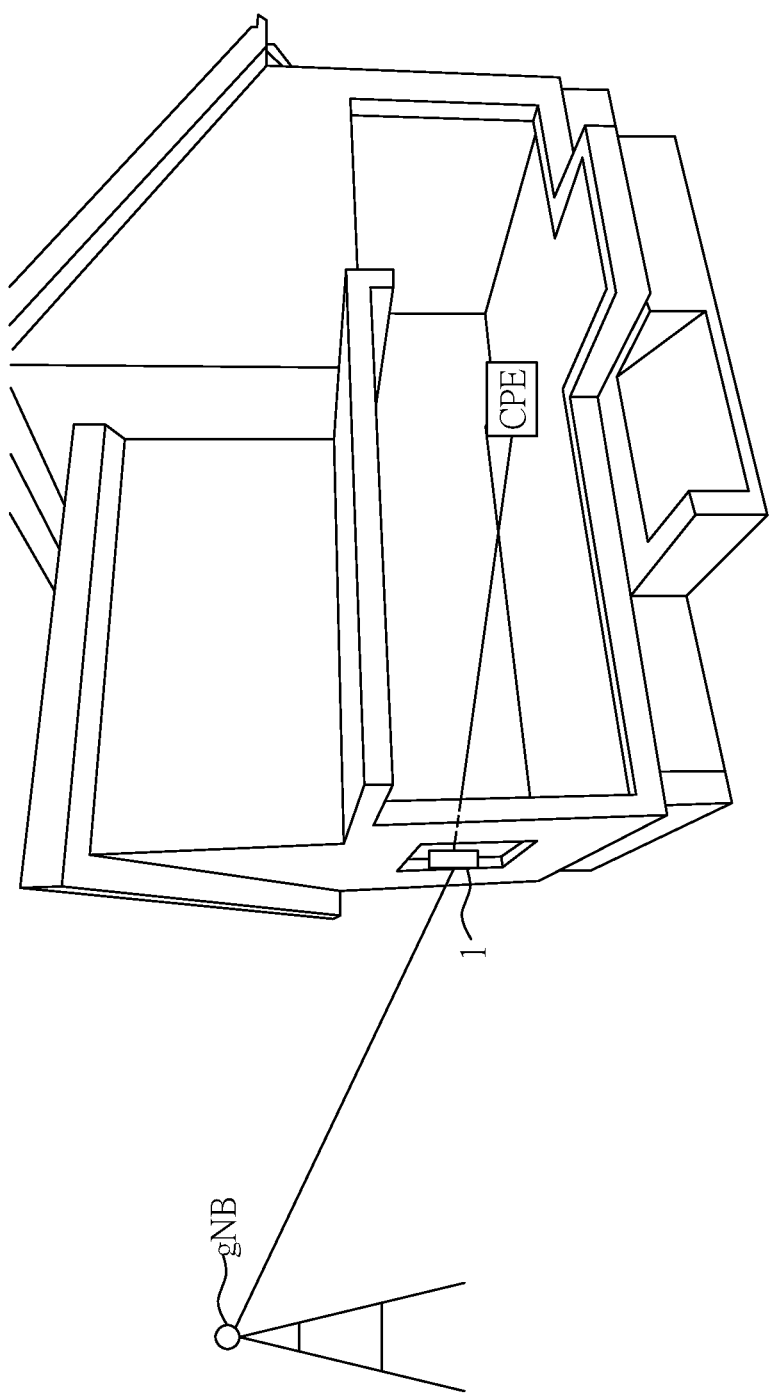
FIG. 2 is a schematic view showing a typical usage scenario of a repeater according to an embodiment of the present disclosure.

FIG. 1 is a block diagram of a repeater according to an embodiment of the present disclosure, and FIG. 2 is a schematic view showing a typical usage scenario of a repeater according to an embodiment of the present disclosure. Referring to FIGS. 1 and 2, the present disclosure provides a repeater 1 including a donor device DR, a service device SV, a down-link circuit DL and an up-link circuit UL. In certain cases, a direct path of transmission between a base station gNB and a CPE is blocked by an obstacle, such as a building, which results in a path loss larger than a predetermined value, e.g., 140 dB, the repeater 1 can be arranged to provide an alternative path between the base station gNB and the CPE, such that the path loss can be reduced.

In telecommunications, the CPE can be any terminal and associated equipment located at a subscriber's premises and connected with a carrier's telecommunication circuit at a demarcation point. The demarcation point is a point established in a building or complex to separate customer equipment from the equipment located in either the distribution infrastructure or central office of the communications service provider. The CPE may include various types of terminal equipment to process received signals to thereby enable subscribers to access to the services.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In the present embodiment, the donor device DR includes a first receiving antenna array Rx1, a first transmitting antenna array Tx1 and a first antenna controller AC1. The first antenna controller AC1 is configured to control the first receiving antenna array Rx1 and the first transmitting antenna array Tx1 to receive and transmit data from and to the base station gNB, respectively.

On the other hand, the service device SV includes a second transmitting antenna Tx2, a second receiving antenna Rx2 and a second antenna controller AC2. The second antenna controller AC2 is configured to control the second receiving antenna Rx2 and the second transmitting antenna Tx2 to receive and transmit data from and to the CPE, respectively.

As shown in FIG. 2, the donor device DR and the service device SV of the repeater 1 can be an outdoor unit and an indoor unit, respectively. Signals from the base station gNB are received by the outdoor unit, and an internal RF circuit is applied to transmit received signals to the indoor unit, i.e., the service device SV. The indoor unit then communicates with the CPE and transfer data. In another embodiment, the outdoor unit can be located indoor near or on a window to simplify the installation. The internal RF circuit can be, for example, the down-link circuit DL or the up-link circuit UL.

Specifically, the down-link circuit DL includes a first low noise amplifier LNA1 coupled to the first receiving antenna array Rx1, a first buffer circuit BUF1 coupled to the first low noise amplifier LNA1, and a first power amplifier PA1 coupled between the first buffer circuit BUF1 and the second transmitting antenna Tx2.

The up-link circuit UL includes a second low noise amplifier LNA2 coupled to the second receiving antenna Rx2, a second buffer circuit BUF2 coupled to the second low noise amplifier LNA2, and a second power amplifier PA2 coupled between the second buffer circuit BUF2 and the first transmitting antenna array Tx1.

Referring to FIG. 1, regarding to the down-link circuit DL, signals are transmitted from the base station gNB to the first receiving antenna array Rx1, and then transmitted through the LNA1, the BUF1, and the PA1 to reach the second transmitting antenna Tx2. After the signals are amplified by the LNA1 and the PA1, the signals with higher levels are transmitted from the second transmitting antenna Tx2 to the CPE.

Similar to the down-link circuit DL, signals in the up-link circuit UL are transmitted from the CPE to the second receiving antenna Rx2, and then transmitted through the LNA2, the BUF2, and the PA2 to reach the first transmitting antenna array Tx1. After the signals are amplified by the LNA2 and the PA2, the signals with higher levels are transmitted from the first transmitting antenna array Tx1 to the base station gNB.

Since the signals are amplified in the down-link circuit DL and up-link circuit UL, four types of interferences can be found between the first transmitting antenna array Rx1 and the second transmitting antenna Tx2, between the second transmitting antenna Tx2 and the second receiving antenna Rx2, between the second receiving antenna Rx2 and the first transmitting antenna array Tx1, and between the first transmitting antenna Tx1 and the second receiving antenna Rx2. Therefore, various configurations are provided in the present disclosure to enhance isolations between transmitting end and receiving end of the repeater 1 to solve issues of the interferences.

Figure 3A:
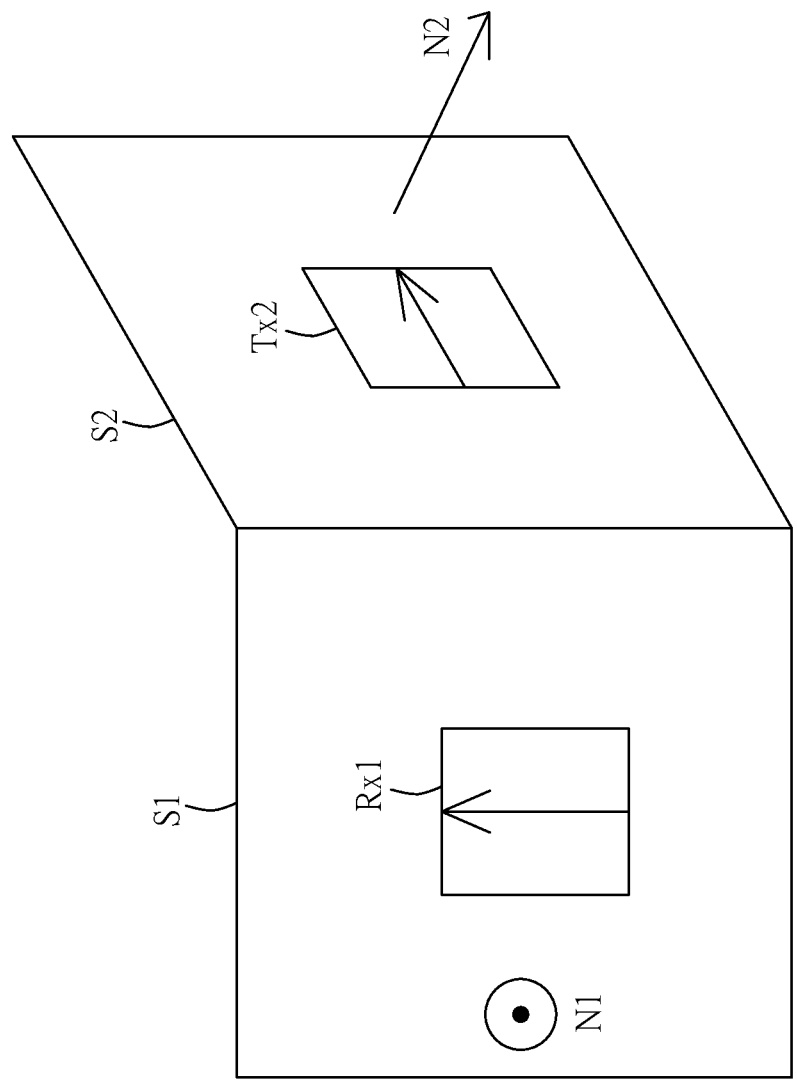
FIG. 3A is a schematic diagram showing an example for polarizations of the first receiving antenna array and the second transmitting antenna according to an embodiment of the present disclosure.

FIG. 3A is a schematic diagram showing an example for polarizations of the first receiving antenna array Rx1 and the second transmitting antenna Tx2 according to an embodiment of the present disclosure. As shown in FIG. 3A, the first receiving antenna array Rx1 is disposed on a first substrate S1 having a first normal direction N1, the second transmitting antenna Tx2 is disposed on a second substrate S2 having a second normal direction N2, the first normal direction N1 is different from the second normal direction N2, and the first receiving antenna array Rx1 and the second transmitting antenna Tx2 are orthogonally polarized with each other.

In this case, the first receiving antenna array Rx1 of the repeater 1 faces the base station gNB while the second transmitting antenna Tx2 faces the CPE. Taking a transmission path for the down-link circuit DL as an example, a link between the base station gNB and the repeater 1 utilizes vertical polarization for the first receiving antenna array Rx1. Thus, a link between the repeater 1 and the CPE should use horizontal polarization for the second transmitting antenna Rx2 to enhance the isolation between the first receiving antenna array Rx1 and the second transmitting antenna Tx2.

Figure 3B:
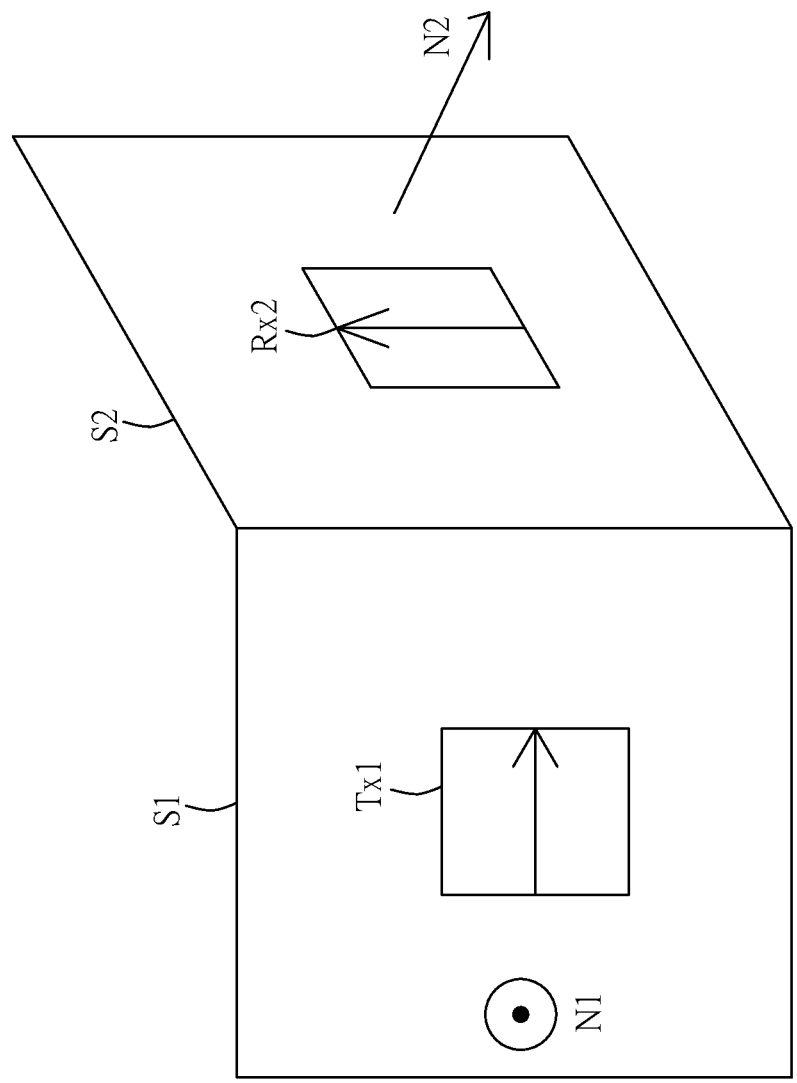
FIG. 3B is a schematic diagram showing another example for polarizations of the first transmitting antenna array and the second receiving antenna according to an embodiment of the present disclosure.

FIG. 3B is a schematic diagram showing another example for polarizations of the first transmitting antenna array Tx1 and the second receiving antenna Rx2 according to an embodiment of the present disclosure. As shown in FIG. 3B, the first transmitting antenna array Rx1 is also disposed on the first substrate S1 having the first normal direction N1, the second receiving antenna Rx2 is also disposed on the second substrate S2 having the second normal direction N2, and the first transmitting antenna array Tx1 and the second receiving antenna Rx2 are orthogonally polarized with each other.

In this case, the first transmitting antenna array Tx1 of the repeater 1 faces the base station gNB while the second receiving antenna Rx2 faces the CPE. Taking a transmission path for the up-link circuit UL as an example, a link between the repeater 1 and the CPE utilizes vertical polarization for the second receiving antenna Rx2, and therefore, a link between the base station gNB and the repeater 1 should use horizontal polarization for the first transmitting antenna array Tx1 to enhance the isolation between the second receiving antenna Rx2 and the first transmitting antenna array Tx1.

Figure 3C:
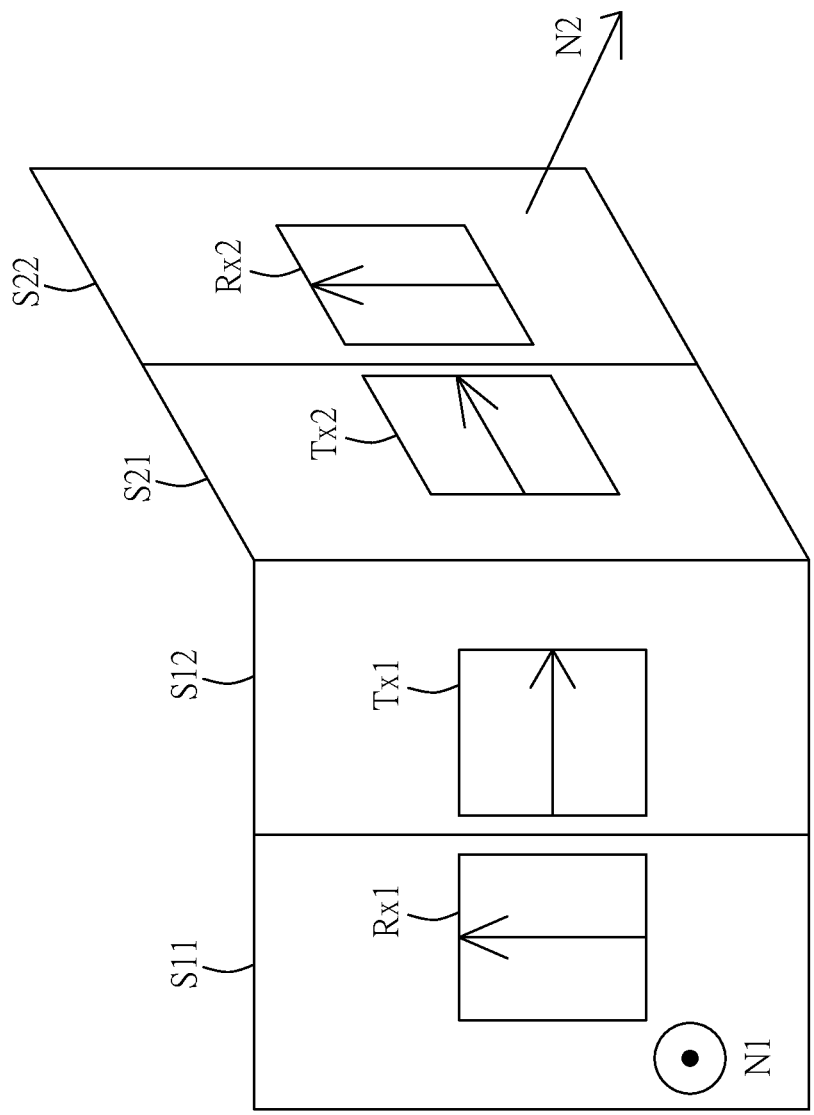
FIG. 3C is a schematic diagram showing another example for polarizations of the first receiving antenna array, the first transmitting antenna array, the second transmitting antenna, and the second receiving antenna according to an embodiment of the present disclosure.

FIG. 3C is a schematic diagram showing another example for polarizations of the first receiving antenna array Rx1, the first transmitting antenna array Tx1, the second transmitting antenna Tx2, and the second receiving antenna Rx2 according to an embodiment of the present disclosure. As shown in FIG. 3C, the first substrate S1 includes a first sub-substrate S11 and a second sub-substrate S12, and the first receiving antenna array Rx1 and the first transmitting antenna array Tx1 are disposed on the first sub-substrate S11 and the second sub-substrate S12, respectively.

Furthermore, the second substrate S2 includes a third sub-substrate S21 and a fourth sub-substrate S22, and the second receiving antenna Rx2 and the second transmitting antenna Tx2 are disposed on the third sub-substrate S21 and the fourth sub-substrate S22, respectively.

Considering a case where the signals are transmitting through the down-link circuit DL and the up-link circuit UL at the same time, a configuration of the polarizations for the first receiving antenna array Rx1, the first transmitting antenna array Tx1, the second transmitting antenna Tx2, and the second receiving antenna Rx2 are shown in FIG. 3C. In this case, the first transmitting antenna array Tx1 is orthogonally polarized with the first receiving antenna array Rx1 and the second receiving antenna Rx2, and the second transmitting antenna Tx2 is orthogonally polarized with the first receiving antenna array Rx1 and the second receiving antenna Rx2. Since all of transmitting ends of the repeater 1 are orthogonally polarized with all of the receiving ends of the repeater 1, an ideal setup is provided to achieve the largest isolations therebetween.

Figure 3D:
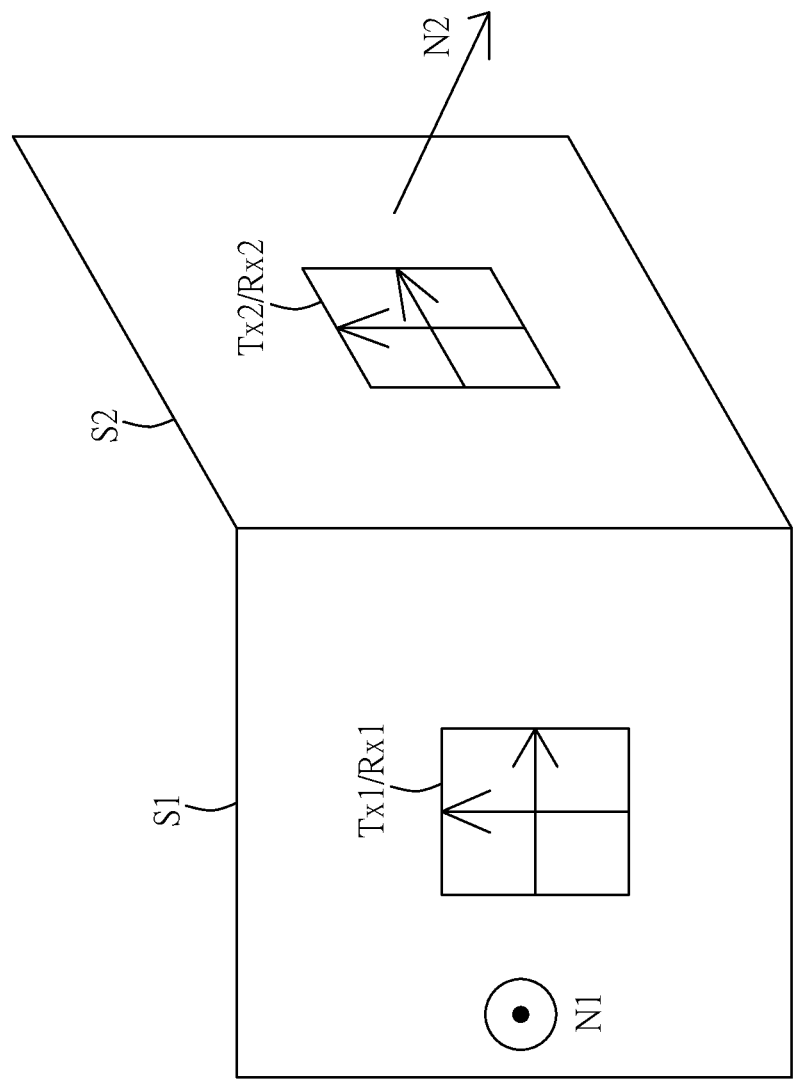
FIG. 3D is a schematic diagram showing another example for polarizations of the first receiving antenna array, the first transmitting antenna array, the second transmitting antenna, and the second receiving antenna according to an embodiment of the present disclosure.

FIG. 3D is a schematic diagram showing another example for polarizations of the first receiving antenna array Rx1, the first transmitting antenna array Tx1, the second transmitting antenna Tx2, and the second receiving antenna Rx2 according to an embodiment of the present disclosure. In the present embodiment, the first transmitting antenna array Tx1 and the first receiving antenna array Rx1 can be provided by sharing one antenna array disposed on the first substrate S1, and the second transmitting antenna Tx2 and the second receiving antenna Rx2 can be provided by sharing one antenna disposed on the second substrate S2. That is, signals between the base station gNB and the repeater 1 are transmitted and received in the same antenna array, and signals between the CPE and the repeater 1 are transmitted and received in the same antenna. In this embodiment, the antenna array at a side of donor device DR and the antenna at a side of the service device SV of the repeater 1 can use dual-polarization antenna structures and switch circuits to achieve the same performance as FIG. 3C while the up-link circuit UL and the down-link circuit DL operate in a Time-Division Duplexing (TDD) mode, which will be described hereinafter.

In the TDD mode, signals are transmitted through the down-link circuit DL and the up-link circuit UL in different timing. In other words, when the signals are transmitted through the up-link circuit UL, the polarization of dual-polarization antenna in the service device SV is switched to a first polarization, and the polarization of dual-polarization antenna structure in the donor device DR is switched to a second polarization. The first polarization is orthogonally polarized with the second polarization, as shown in FIG. 3D.

Figure 3E:
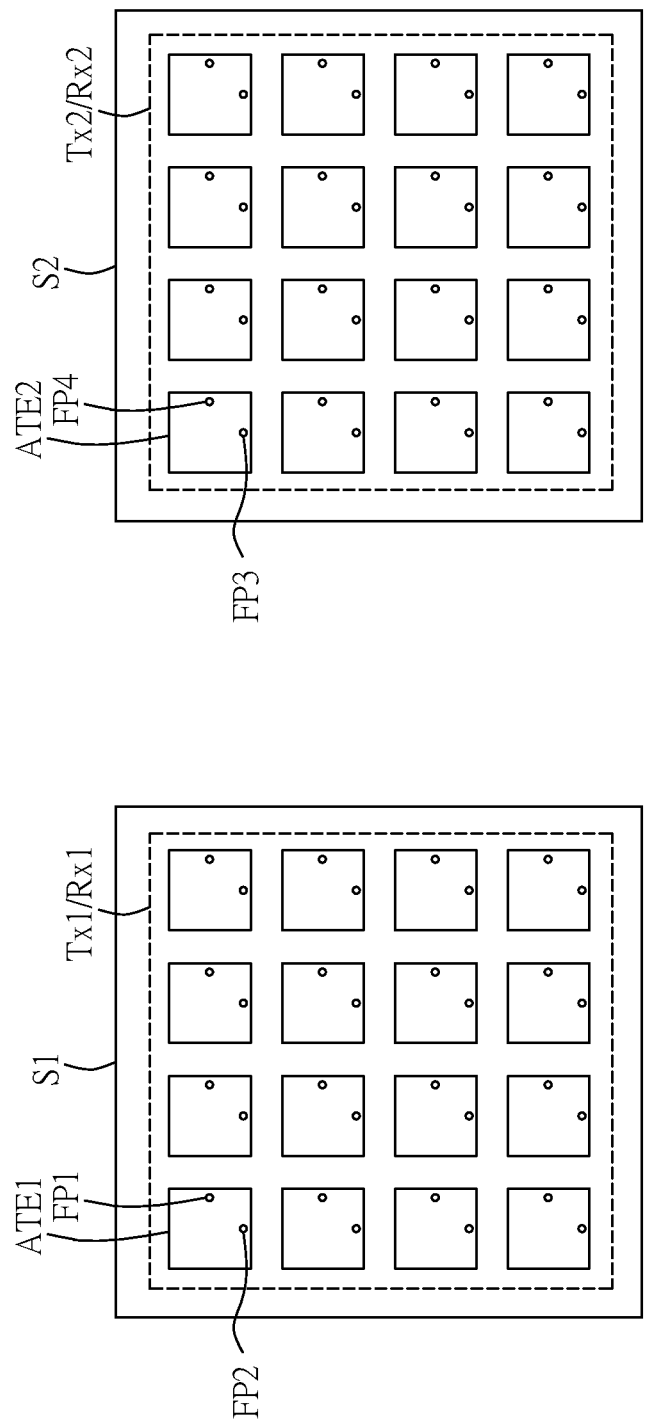
FIG. 3E is a schematic diagram showing dual-polarization antenna structure in the donor device and the service device according to an embodiment of the present disclosure.

FIG. 3E is a schematic diagram showing dual-polarization antenna structures in the donor device DR and the service device SV according to an embodiment of the present disclosure. Reference is made to FIG. 3E, the first receiving antenna array Rx1 and the first transmitting antenna array Tx1 can each includes a plurality of first antenna elements ATE1, and the second receiving antenna Rx2 and the second transmitting antenna Tx2 can include one or more second antenna elements ATE2. When the polarization of dual-polarization antenna in the donor device DR is switched to a first polarization, first feeding points FP1 or FP2 can be utilized to provide the first polarization for the first transmitting antenna array Tx1. At the same time, the polarization of dual-polarization antenna structure in the service device SV should be switched to the second polarization, third feeding points FP3 or FP4 can be used to provide the second polarization for the second receiving antenna Rx2, and the first polarization is orthogonally polarized with the second polarization. It should be noted that the polarization fed from the first feeding point FP1 is orthogonal with the polarization fed from the third feeding point FP3 and the polarization fed from FP2 is orthogonal with the polarization fed from FP4.

On the other hand, when the signals are transmitted through the down-link circuit DL, the polarization of dual-polarization antenna in the donor device DR is switched to the second polarization, second feeding points FP1 or FP2 can be utilized to provide the second polarization for the first receiving antenna array Rx1. At the same time, the polarization of dual-polarization antenna structure in the service device SV should be switched to the first polarization, fourth feeding points FP3 or FP4 can be used to provide the first polarization for the second transmitting antenna Tx2.

Figure 4:
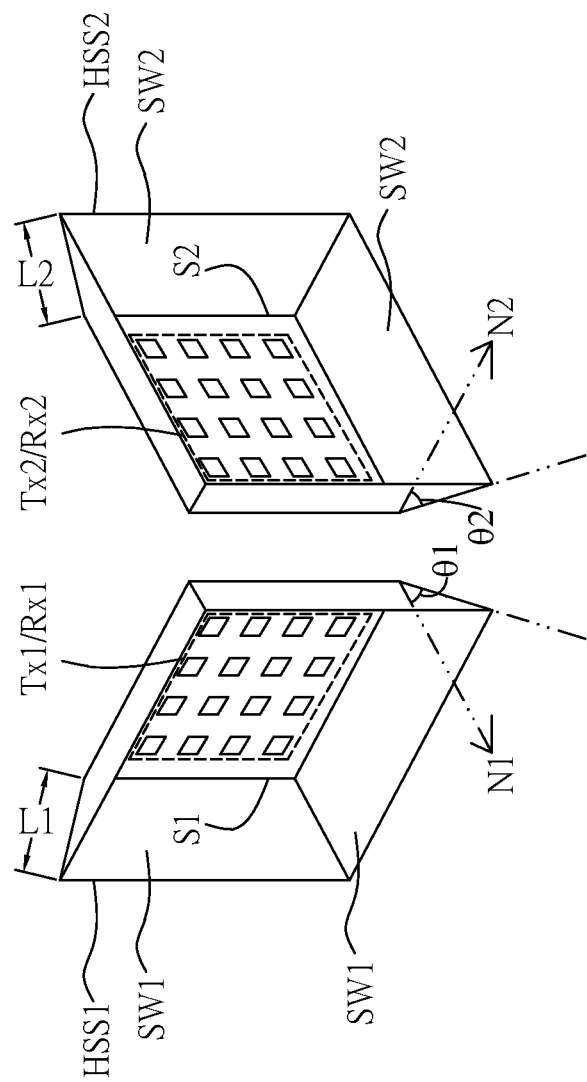
FIG. 4 is a schematic diagram showing a first horn-shaped shielding and a second horn-shaped shielding of the repeater according to an embodiment of the present disclosure.

FIG. 4 is a schematic diagram showing a first horn-shaped shielding and a second horn-shaped shielding of the repeater according to an embodiment of the present disclosure. In the present embodiment, the repeater 1 further includes a first horn-shaped shielding HSS1 and a second horn-shaped shielding HSS2. The first horn-shaped shielding HSS1 has a plurality of first side walls SW1 disposed along sides of the first substrate S1, and the plurality of first side walls SW1 are each tilted with a first predetermined angle θ1 with respect to the first normal direction N1 of the first sub-substrate S1. Similarly, the second horn-shaped shielding HSS2 has a plurality of second side walls SW2 disposed along sides of the second substrate S2, and the plurality of second side walls SW2 are tilted with a second predetermined angle θ2 with respect to the second normal direction N2 of the second sub-substrate S2.

In this case, the first horn-shaped shielding HSS1 and the second horn-shaped shielding HSS2 are provided to isolate signals between transmitting ends and receiving ends of the repeater 1. A length L1 of the first side wall SW1 and a length L2 of the second side wall S2 can be about a wavelength related to a frequency which the repeater 1 operates, for example, about 10 mm related to 28 GHz of the frequency. Moreover, the first predetermined angle θ1 and the second predetermined angle θ2 can each ranges from 30 degrees to 60 degrees, and the isolation between the transmitting ends and the receiving ends can be improved by about 13 dB at 28 GHz.

Furthermore, it is mentioned that one or more second antenna elements ATE2 can be utilized in each of the second transmitting antenna Tx2 and the second receiving antenna Rx2, as shown in FIG. 3E. It should be noted that, for a dedicated CPE repeater, the second transmitting antenna Tx2 and the second receiving antenna Rx2 can each includes merely one second antenna element ATE2. In this case, the CPE is disposed next to the repeater 1 in a near-field condition and communicates with the repeater 1 over-the-air. The near-field condition can be defined by setting a distance between the CPE and the repeater 1 to be lower than $2*D*D/\lambda$, where D is an antenna dimension and $\lambda$ is the wavelength related to the frequency which the repeater 1 operates. It should be noted that the antenna dimension D can be a diagonal length of a circuit board on which the antenna are disposed. Therefore, multipath reflections, a number of required second antenna elements ATE2 for the repeater-to-CPE and CPE-to-repeater links, power consumption and associate heat issues, and cost can be reduced. The dedicated CPE repeater also facilitates an integration of the repeater 1 and the CPE into a one-box configuration.

In certain embodiments, the second transmitting antenna Tx2 can include a second transmitting antenna array consisting of a plurality of second antenna elements ATE2, and the second receiving antenna can include a second receiving antenna array consist of the plurality of second antenna elements ATE2.

Figure 5:
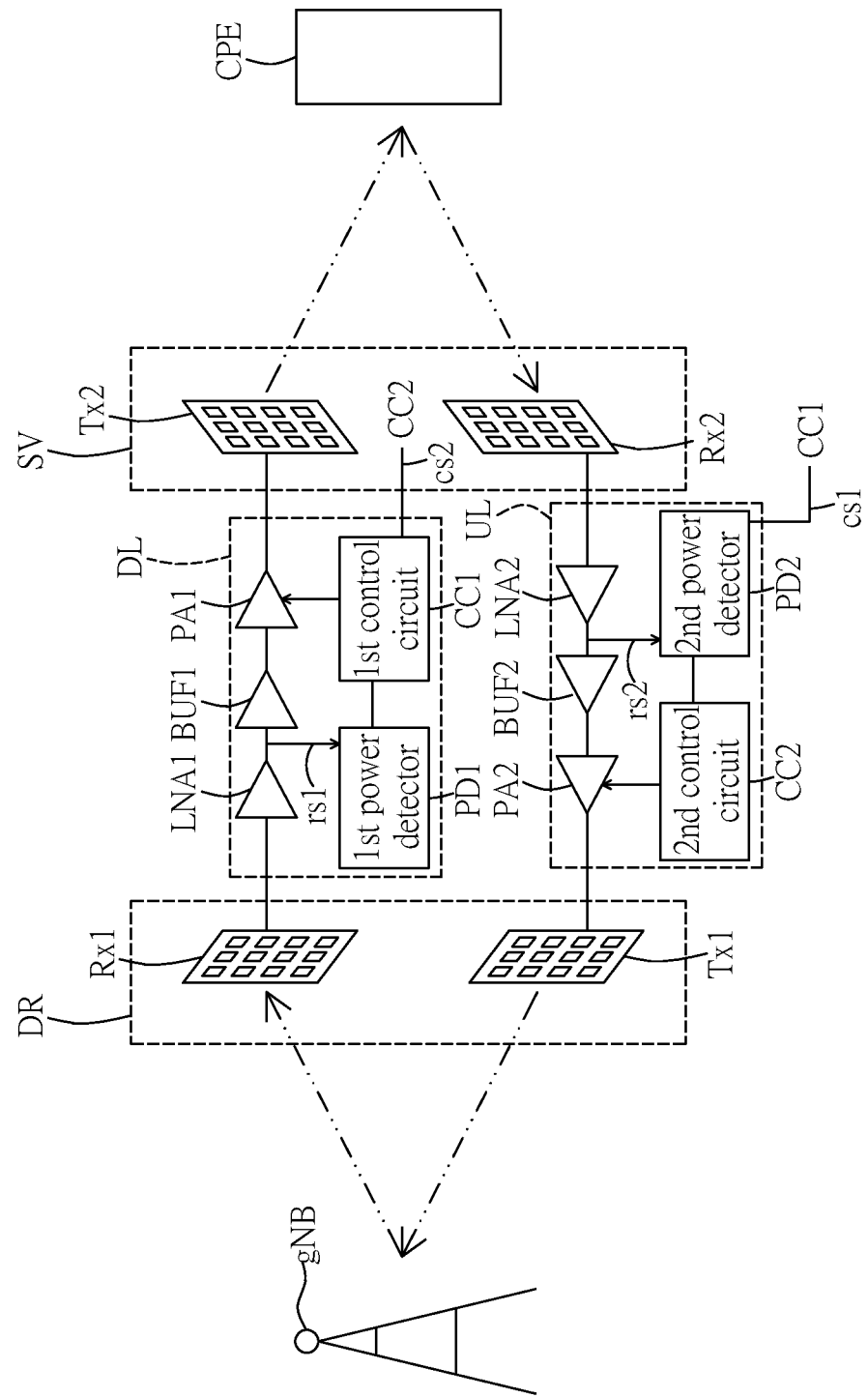
FIG. 5 is another block diagram of a repeater according to an embodiment of the present disclosure.

FIG. 5 is another block diagram of a repeater according to an embodiment of the present disclosure. Reference is made to FIG. 5, the down-link circuit DL further includes a first power detector PD1 and a first control circuit CC1. The PD1 is configured to detect a first received signal strength indication (RSSI) of a first signal rs1 from the LNA1, and the first control circuit CC1 is configured to determine whether the first RSSI is higher than a first threshold or lower than a second threshold. If the first RSSI is determined to be higher than the first threshold, the first control circuit CC1 is configured to adjust a gain of the PA1 to be decreased. If the first RSSI is determined to be lower than the second threshold, the first control circuit CC1 is configured to adjust the gain of the PA1 to be increased.

In more detail, a coupler can be provided between the LNA1 and the BUF1 to divide a control flow from a signal flow. The control flow is performed through millimeter wave power detector, that is, the PD1, and an RSSI threshold logic, that is, the first control circuit CC1. The first power detector PD1 can obtain amplitude and calculate RSSI according to the amplitude of the first received signal rs1 when the first receiving antenna array Rx1 receives signals in a predetermined beam direction. An output of the first power detector PD1 is connected to the first control circuit CC1 including the threshold logic and a micro controller, for example, which has one output to control on and off states of the first power amplifier PA1.

For example, when the RSSI of the first received signal rs1 exceeds a threshold, the threshold logic or micro controller outputs a first switch signal to turn on the first power amplifier PA1. When the RSSI of the first received signal rs1 is lower than the threshold, the threshold logic or micro controller outputs a second switch signal to turn off the first power amplifier PA1, thereby avoiding coupling interferences from the transmitting end to the receiving end of the repeater 1 to obtain a better isolation. It should be noted that the threshold logic or the micro controller can be configured to determine whether an amplitude of the first received signal rs1 exceeds an amplitude threshold corresponding the RSSI threshold mentioned above.

Similarly, the up-link circuit UL further includes a second power detector PD2 and a second control circuit CC2. The PD2 is configured to detect a second received signal strength indication (RSSI) of a second signal rs2 from the second low noise amplifier LNA2, and the second control circuit CC2 is configured to determine whether the second RSSI is higher than a fourth threshold or lower than a fifth threshold.

If the second RSSI is determined to be higher than the fourth threshold, the second control circuit CC2 is configured to adjust a gain of the second power amplifier PA2 to be decreased. If the second RSSI is determined to be lower than the fifth threshold, the second control circuit CC2 is configured to adjust the gain of the second power amplifier PA2 to be increased.

In certain embodiments, the first control circuit CC2 can be further configured to determine whether the first RSSI is lower than a third threshold. If the first RSSI is lower than the third threshold, the first control circuit CC2 is configured to turn off the first PA, and the third threshold is lower than the second threshold. In this case, the third threshold is provided to avoid output leakage from the down-link circuit DL into an input of the up-link circuit UL, thereby enhancing the isolation between the up-link circuit UL and the down-link circuit DL.

Similarly, the second control circuit CC2 can also be configured to determine whether the second RSSI is lower than a sixth threshold. If the second RSSI is lower than the sixth threshold, the second control circuit is configured to turn off the first PA, and the sixth threshold is lower than the fifth threshold. The fifth threshold is provided to avoid output leakage from the up-link circuit UL into an input of the down-link circuit DL, thereby enhancing the isolation between the up-link circuit UL and the down-link circuit DL.

For the TDD mode, the second control circuit CC2 can transmit a first control signal cs1 to the first control circuit CC1 when the second signal rs2 is detected to be received from the second low noise amplifier LNA2 by the second power detector PD2, and the first control circuit CC1 is configured to turn off the first power amplifier PA1 when the first control signal cs1 is received.

On the other hand, the first control circuit CC1 can transmit a second control signal cs2 to the second control circuit CC2 when the first signal rs1 is detected to be received from the first low noise amplifier LNA1 by the first power detector PD1, and the second control circuit CC2 is configured to turn off the second power amplifier PA2 when the second control signal cs2 is received. Therefore, operation for the TDD mode can be performed in the repeater by using the first control circuit CC1 and the second control CC2, and the first control circuit CC1 and the second control CC2 can be integrated into a single control circuit, such as a microcontroller. In addition, the first antenna controller AC1 can control the first receiving antenna array Rx1 to sweep radiation patterns in different beam directions. The first control circuit CC1 can further compare different RSSI values in different beam directions by the first power detector PD1 and select one of the radiation patterns having the largest RSSI. Then, the first control circuit CC1 sends another control signal to the first antenna controller AC1 to maintain the radiation pattern with the largest RSSI. Likewise, the same procedure could apply to the up-link circuit UL.

Figure 6:
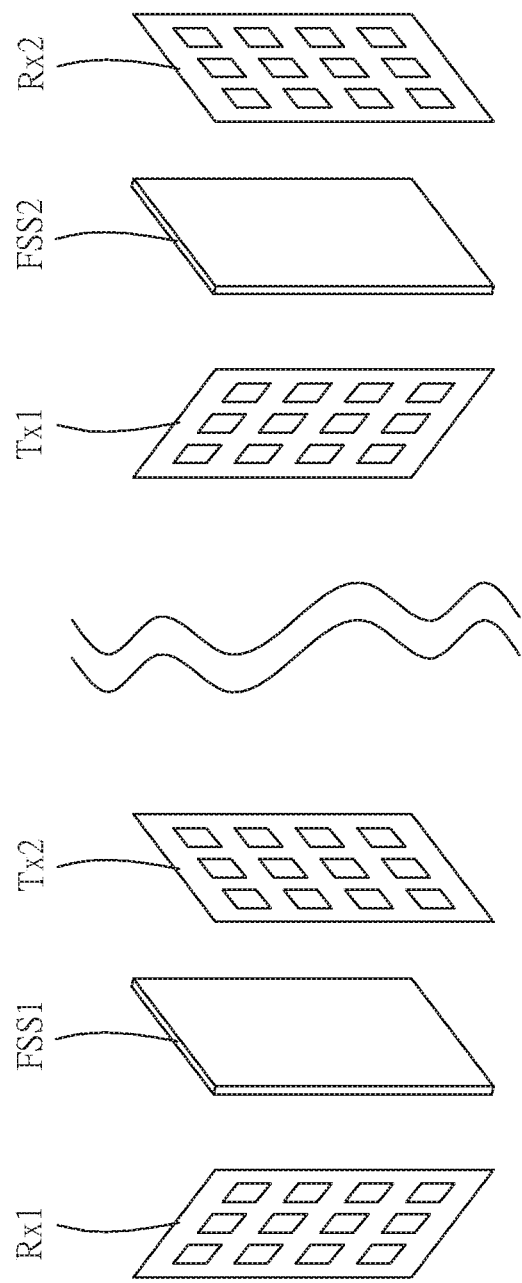
FIG. 6 is a schematic diagram showing arrangements of a first frequency selective surface and a second frequency selective surface according to an embodiment of the present disclosure.

FIG. 6 is a schematic diagram showing arrangements of a first frequency selective surface and a second frequency selective surface according to an embodiment of the present disclosure. In FIG. 6, the repeater 1 can further include the first frequency selective surface FSS1 and the second frequency selective surface FSS2. The first frequency selective surface FSS1 is disposed between the first receiving antenna array Rx1 and the second transmitting antenna Tx2, and the second frequency selective surface FSS2 is disposed between the second receiving antenna Rx2 and the first transmitting antenna array Tx1.

For example, the first receiving antenna array Rx1 and the second transmitting antenna Tx2 can be close to each other, for example, few centimeters, and when a gain is high in the down-link circuit DL or an output power of the down-link circuit DL is high, the coupling effect may be strong for a near field condition.

In this case, the first frequency selective surface FSS1 and the second frequency selective surface FSS2 are provided to suppress near field coupling between the receiving ends and the transmitting ends of the repeater 1. The inserted first frequency selective surface FSS1 and the second frequency selective surface FSS2 can each be made of wave-absorbing material that can absorb EM waves in an operation bandwidth of the repeater 1. Also, the first frequency selective surface FSS1 and the second frequency selective surface FSS2 can be designed with specific structures, which can suppress surface current and create a band stop zone. Therefore, the frequency selective surface can be utilized to enhance isolations between the transmitting ends and the receiving ends of the repeater 1 by combining these two advantages.

Figure 7A:
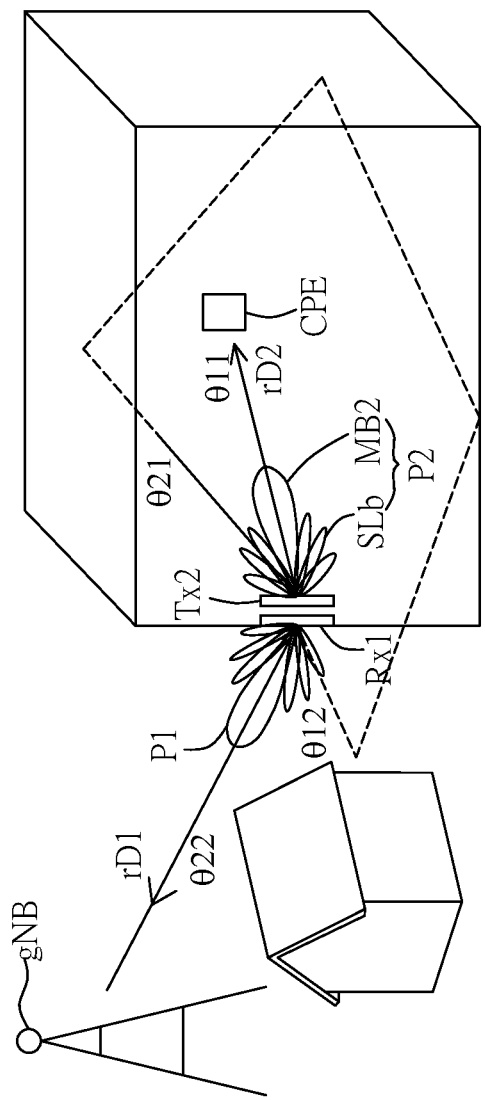
FIG. 7A is a typical scenario showing a connection between the customer premise equipment and the base station relayed by a millimeter wave repeater according to an embodiment of the present disclosure.

Reference is made to FIG. 7A, which is a typical scenario showing a connection between the customer premise equipment CPE and the base station gNB relayed by a millimeter wave repeater according to an embodiment of the present disclosure, such as the repeater 1 provided by the present disclosure.

In this case, the first antenna controller AC1 can controls the first receiving antenna array Rx1 to receive data with a first radiation pattern P1 having a first receiving direction rD1, the second antenna controller AC2 can control the second transmitting antenna Tx2 to transmit data with a second radiation pattern P2 having a second transmitting direction rD2, and the second radiation pattern P2 includes a second main beam MB2 along the second transmitting direction rD2 and a plurality of side lobes SLb.

Figure 7B:
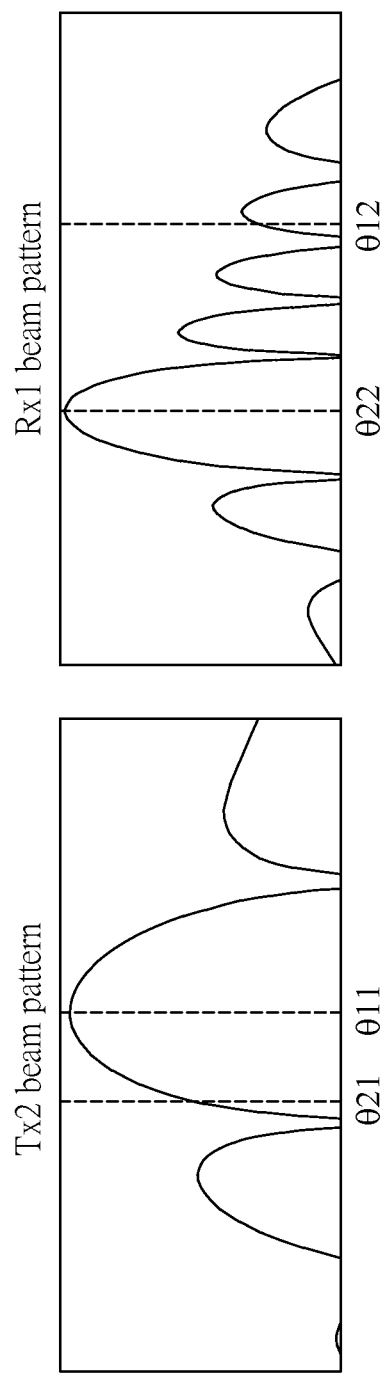
FIG. 7B shows beam patterns, the AoAs and the AoDs according to an embodiment of the present disclosure.

In detail, beamforming technique is applied to direct the second transmitting antenna Tx1 to the customer premise equipment CPE, and direct the first receiving antenna array Rx1 to the base station gNB for a maximum gain. An angle of departure (AoD) for the first transmitting antenna array Tx1 of the repeater 1 is θ11, and an angle of arrival (AoA) for the first receiving antenna array Rx1 is θ22. For the first transmitting antenna array Tx1 and the first receiving antenna array Rx1, the side lobes SLb create multiple paths from the second transmitting antenna Tx2 to the first receiving antenna array Rx1, the multiple paths are unwanted since the isolation between the second transmitting antenna Tx2 to the first receiving antenna array Rx1 may be degraded. For example, the path starts from the second transmitting antenna Tx2 with the AoD of the angle θ21, reflected by the ceiling, wall, floor, and outdoor obstacle (such as a building shown in FIG. 7A), and finally reaches the first receiving antenna array Rx1, and a beam patterns of the second transmitting antenna Tx2 to the first receiving antenna array Rx1 are shown in FIG. 7B, which shows beam patterns, the AoAs and the AoDs according to an embodiment of the present disclosure.

Figure 8:
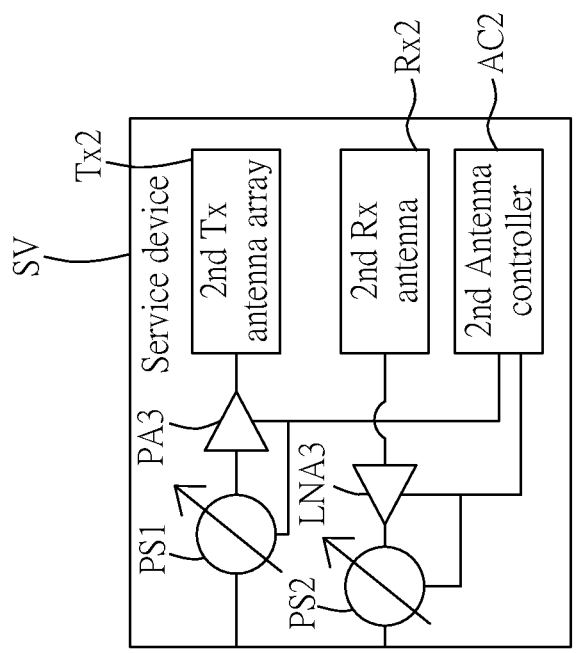
FIG. 8 is a block diagram of the service device according to an embodiment of the present disclosure.

Reference is now made to FIG. 8, which is a block diagram of the service device according to an embodiment of the present disclosure. As shown, the service device SV can further include a first phase shifter PS1, a second phase shifter PS2, a third power amplifier PA3 and a third low noise amplifier. The gains of the side lobes SLb can be adjusted by using the second antenna controller AC2 to control the first phase shifter PS1 and the third power amplifier PA3, and the second antenna controller AC2 can be configured to decrease gains of the side lobes SLb by executing a controlling algorithm, such as providing specific weighting vector by using Chebyshev polynomials to control the side lobes SLb of the second transmitting antenna Tx2. Likewise, the same procedure could apply to the up-link circuit UL. In the present embodiment, the second receiving antenna Rx2 can be connected to the third low noise amplifier LNA3, and the second phase shifter PS2 and the third low noise amplifier LNA3 can be controlled by the second antenna controller AC2 when signals received by the second receiving antenna Rx2.

It should be note that the described RSSI detection, beamforming, and PA on/off techniques provided by the present disclosure in the TDD mode can be used on any generic wireless repeater or relay links, including a link between one repeater and another repeater, the down-link device (e.g., from the base station to the CPE), or the up-link device (e.g., CPE to the base Station).

Furthermore, the described techniques utilized in the repeater provided by the present disclosure can be applicable to a public repeater, a dedicated home repeater (serving one or more homes), a dedicated CPE repeater, an indoor repeater, an outdoor repeater, or a hybrid (partially indoor and partially outdoor) repeater, and the repeater can operate in sub-6 GHz and above-6 GHz frequency bands.

In conclusion, the repeater provided by the present disclosure can provide better isolation by utilizing orthogonally polarized antenna array on transmitting ends and receiving ends, respectively, and a horn-shaped shielding are also used to isolate signals transmitted from the transmitting ends and the receiving ends of the repeater.

In addition, power detectors and control circuits can be utilized to turn power amplifiers on/off to get better isolation between the transmitting ends and the receiving ends of the repeater, and better isolation between the up-link device and the down-link device in TDD mode.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A repeater, comprising:
   a donor device, including a first receiving antenna array and a first transmitting antenna array disposed on a first substrate having a first normal direction, and a first antenna controller configured to control the first receiving antenna array and the first transmitting antenna array to receive and transmit data from and to a base station, respectively;
   a service device, including a second receiving antenna and a second transmitting antenna disposed on a second substrate having a second normal direction, and a second antenna controller configured to control the second receiving antenna and the second transmitting antenna to receive and transmit data from and to a customer premise equipment (CPE), respectively;
   a down-link (DL) circuit, including:
   a first low noise amplifier (LNA) coupled to the first receiving antenna array;
   a first buffer circuit coupled to the first LNA;
   a first power amplifier (PA) coupled between the first buffer circuit and the second transmitting antenna;
   a first power detector configured to detect a first received signal strength indication (RSSI) of a first signal from the first LNA; and
   a first control circuit configured to determine whether the first RSSI is higher than a first threshold or lower than a second threshold;
   an up-link circuit, including:
   a second low noise amplifier (LNA) coupled to the second receiving antenna;
   a second buffer circuit coupled to the second low noise amplifier;
   a second power amplifier (PA) coupled between the second buffer circuit and the first transmitting antenna array,
   wherein the first normal direction is different from the second normal direction, and
   wherein the first receiving antenna array and the second transmitting antenna are orthogonally polarized with each other,
   wherein if the first RSSI is determined to be higher than the first threshold, the first control circuit is configured to adjust a gain of the first PA to be decreased, and
   wherein if the first RSSI is determined to be lower than the second threshold, the first control circuit is configured to adjust the gain of the first PA to be increased.

2. The repeater according to claim 1, wherein the second transmitting antenna and the second receiving antenna are orthogonally polarized with each other.

3. The repeater according to claim 1, wherein the first receiving antenna array and the second transmitting antenna are orthogonally polarized with each other.

4. The repeater according to claim 1, wherein the first transmitting antenna array and the second receiving antenna are orthogonally polarized with each other.

5. The repeater according to claim 1, wherein the first substrate includes a first sub-substrate and a second sub-substrate, and the first receiving antenna array and the first transmitting antenna array are disposed on the first sub-substrate and the second sub-substrate, respectively.

6. The repeater according to claim 5, wherein the second substrate includes a third sub-substrate and a fourth sub-substrate, and the second receiving antenna and the second transmitting antenna are disposed on the third sub-substrate and the fourth sub-substrate, respectively.

7. The repeater according to claim 1, further comprising:
   a first horn-shaped shielding having a plurality of first side walls disposed along sides of the first substrate, wherein the plurality of first side walls are tilted with a first predetermined angle with respect to the first normal direction of the first sub-substrate; and
   a second horn-shaped shielding having a plurality of second side walls disposed along sides of the second substrate, wherein the plurality of second side walls are tilted with a second predetermined angle with respect to the second normal direction of the second sub-substrate.

8. The repeater according to claim 1, wherein the second transmitting antenna further includes a second transmitting antenna array, and the second receiving antenna further includes a second receiving antenna array.

9. The repeater according to claim 1, wherein the first control circuit is configured to determine whether the first RSSI is lower than a third threshold,
   wherein if the first RSSI is lower than the third threshold, the first control circuit is configured to turn off the first PA, and
   wherein the third threshold is lower than the second threshold.

10. The repeater according to claim 9, wherein the UL circuit further includes:
    a second power detector configured to detect a second received signal strength indication (RSSI) of a second signal from the second LNA;
    a second control circuit configured to determine whether the second RSSI is higher than a fourth threshold or lower than a fifth threshold,
    wherein if the second RSSI is determined to be higher than the fourth threshold, the second control circuit is configured to adjust a gain of the second PA to be decreased;
    wherein if the second RSSI is determined to be lower than the fifth threshold, the second control circuit is configured to adjust the gain of the second PA to be increased.

11. The repeater according to claim 10, wherein the second control circuit is configured to determine whether the second RSSI is lower than a sixth threshold,
    wherein if the second RSSI is lower than the sixth threshold, the second control circuit is configured to turn off the first PA, and
    wherein the sixth threshold is lower than the fifth threshold.

12. The repeater according to claim 11, wherein the second control circuit is further configured to transmit a first control signal to the first control circuit when the second signal is detected to be received from the second LNA by the second power detector, and
    wherein the first control circuit is configured to turn off the first PA when the first control signal is received.

13. The repeater according to claim 12, wherein the first control circuit is further configured to transmit a second control signal to the second control circuit when the first signal is detected to be received from the first LNA by the first power detector, and
    wherein the second control circuit is configured to turn off the second PA when the second control signal is received.

14. The repeater according to claim 1, further comprising:
a first frequency selective surface (FSS) disposed between the first receiving antenna array and the second transmitting antenna; and
a second frequency selective surface (FSS) disposed between the second receiving antenna and the first transmitting antenna array.

15. The repeater according to claim 1, wherein the first antenna controller is configured to control the first receiving antenna array to receive data with a first radiation pattern having a first receiving direction,
wherein the second antenna controller is configured to control the second transmitting antenna to transmit data with a second radiation pattern having a second transmitting direction, wherein the second radiation pattern includes a second main beam along the second transmitting direction and a plurality of side lobes, and
wherein the second antenna controller is configured to decrease levels of the side lobes by executing a controlling algorithm.

* * * * *